W. CLARK.
ANGLE FINDER.
APPLICATION FILED JULY 17, 1907.
899,692.
Patented Sept. 29, 1908.
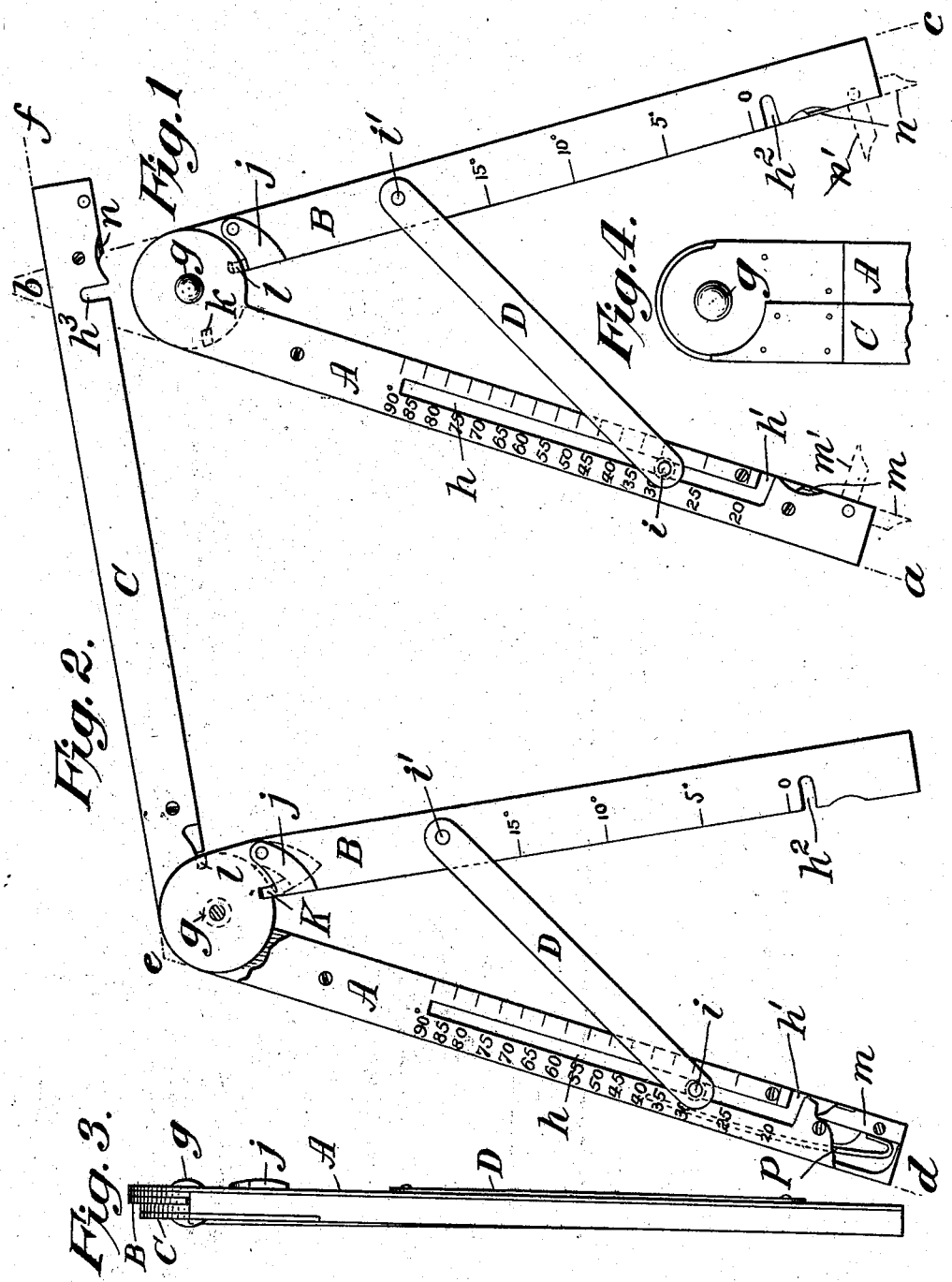
Attest:
Edgeworth Greene
M. G. Westervelt
Inventor:
Walter Clark
by W. P. Preble Jr.
his Atty.

UNITED STATES PATENT OFFICE.

WALTER CLARK, OF NEW ROCHELLE, NEW YORK.

ANGLE-FINDER.

No. 899,692.  Specification of Letters Patent.  Patented Sept. 29, 1908.

Application filed July 17, 1907. Serial No. 384,229.

*To all whom it may concern:*

Be it known that I, WALTER CLARK, a citizen of the United States of America, and a resident of New Rochelle, county of Westchester, and State of New York, have invented certain new and useful Improvements in Angle-Finders, of which the following is a specification.

The object of my invention is to provide a simple, strong, and handy instrument by means of which, among other things, angles whether acute or obtuse can be easily and accurately measured or "found". To this extent my invention is what is generally known as an angle-finder. In order to render this instrument more convenient to engineers, builders, and others I preferably combine with the angle finding feature, various other measuring capabilities such as, calipers, compasses, carpenter's square, bevel and foot-rule,—but the main object is to provide an angle finder. To accomplish this result I avail myself of the principle that an obtuse angle is just ninety degrees greater than the corresponding acute angle, and I thereby make a single indication of the degree of angle indicate either an equivalent acute angle or its corresponding obtuse angle according to the spread of the instrument.

In using this instrument the outer edges are to be set so as to coincide with the right lines forming the angle to be "found" and the indication read upon the scale. This indication corresponds to the spread of the legs of the device. By making one of these legs, preferably the right hand leg, duplex and capable of dividing to the extent of ninety degrees where the two parts may be locked into a rigid square which will move as a unit I convert the simple leg into a moving right-angle so that the outer edge adds just ninety degrees to the indication read upon the scale. When an acute angle is desired the square is unlocked and the two parts of the separable leg folded together again.

My invention, therefore, consists in an angle finder composed of three legs pivoted together at one end and provided wth a suitable degree indicator adapted to move in proportion to the separation of said legs,—two of said legs being adapted to lie in unison as a single leg when acute angles are to be measured, and to be separated to form a rigid swinging right angle or square when obtuse angles are to be measured.

In the accompanying drawings, Figure 1, represents my improved angle finder as used in measuring the acute angle $a, b, c$. Fig. 2, represents it as used in measuring the obtuse angle $d, e, f$. Fig. 3, is a side view of the instrument closed. Fig. 4, is a rear view of the upper end.

Same letters indicate similar parts in the different figures.

The instrument consists essentially of the three legs, A, B, and C, and the degree indicator D. The upper ends of the three legs are pivoted together by the rivet $g$. One leg, preferably the left leg, A, has a slot $h$, in which the pin $i$, of the indicator D plays. The other end of the indicator is pivoted at $i'$, to the other leg B at such a point that when the pin $i$ has reached the top of the slot $h$, the two legs A, and B, will form a right angle. The opening $h'$, into the slot $h$, and the slot $h^2$, are opposite each other so that the pin $i$, can be passed from one leg to the other as desired. Both legs are provided with suitable scales, the left leg, preferably registering large acute angles as from 20° to 90°, while the right leg indicates small angles that is less than 20°.

In measuring an angle of any kind it is necessary that the pin $i$, should rest in the slot $h$, so that the inclination of the indicating arm D, should conform to the graduations on the scales. When the pin $i$, is at twenty degrees or over, the indication of the angle may be read by the position of the pin.

When the pin $i$, is in the slot $h$, below the twenty degree mark, the movement of the pin end of the indicating arm for changes in the separation of the legs is too slight to make it easy to indicate the differences of degree upon that leg, therefore I place the scale for small angles on the other leg in such position that an indication is read at the point where the lower edge of the indicating arm D, cuts the scale.

The third leg C, is adapted to lie directly under the leg B, in which case the slot $h^3$, registers with the slots $h'$, and $h^2$, as shown in Fig. 1, or the two legs B, C, may be spread to form a right angle as shown in Fig. 2, in which position they are preferably locked by some suitable contrivance so that the right angle may swing around the pivot $g$ as a unit, to replace the leg B.

I have shown a latch $j$ secured to the leg B and adapted to engage the slot $k$ of the leg C when the rigid right angle is to be formed and to engage the slot *l* of the leg C when acute angles only are to be measured.

To adapt this angle finder for use as calipers, or compasses, I provide the points *m*, *n*, at the ends of the legs A and C, where they are normally folded in out of the way as shown in Fig. 2. When the device is to be used as a small compass these points are to be turned out into the position shown at *m* and *n*, Fig. 1; and when as a large compass or as calipers, into the position shown at *m'*, *n'*.

These points are under the pressure of an ordinary knife spring, *p*.

It will be obvious that when the instrument is so spread as to make the legs A and B form a right line, the device can be used as a foot rule, and when the legs B and C have been fixed as a right angle, the device can be used as a carpenter's square by bringing the legs A and B together so that their edges are parallel. The use of the device as a bevel will also be obvious.

I claim:—

An angle-finder composed of three legs pivoted together at one end, a scale for small angles on one leg, a scale for large angles on another leg, and a moving arm adapted to indicate the amount of angle which corresponds with the separation of said legs; two of said legs being adapted to lie in unison as a single leg when acute angles are to be measured and to be separated to form a rigid swinging right angle when obtuse angles are to be measured.

Signed at New York city, this 15th day of July 1907.

WALTER CLARK.

Witnesses:
M. A. WESTERVELT,
W. P. PREBLE, Jr.